US007494193B2

(12) United States Patent
Wedekind

(10) Patent No.: US 7,494,193 B2
(45) Date of Patent: Feb. 24, 2009

(54) WIND ENERGY PLANT WITH A HYDRAULICALLY ACTUATED ROTOR BRAKE

(75) Inventor: Christian Wedekind, Hamburg (DE)

(73) Assignee: Nordex Energy GmbH, Norderstedt (DE)

( * ) Notice: Subject to any disclaimer, the term of this patent is extended or adjusted under 35 U.S.C. 154(b) by 0 days.

(21) Appl. No.: 11/775,977

(22) Filed: Jul. 11, 2007

(65) Prior Publication Data
US 2008/0164751 A1 Jul. 10, 2008

(30) Foreign Application Priority Data
Jan. 10, 2007 (DE) .................. 10 2007 002 137

(51) Int. Cl.
*B60T 13/68* (2006.01)
(52) U.S. Cl. ............................. 303/2; 60/413
(58) Field of Classification Search ............ 303/2, 303/3, 14, 15, 9.61, 9.62, 10; 60/404, 413, 60/422
See application file for complete search history.

(56) References Cited
U.S. PATENT DOCUMENTS 4,142,368 A 3/1979 Mantegani 5,611,199 A * 3/1997 Bray ......................... 60/404
6,254,197 B1 * 7/2001 Lading et al. ................ 303/2
6,477,836 B1 * 11/2002 Bianchetta et al. .......... 60/422
6,619,754 B1 * 9/2003 Dombek et al. ............. 298/1 C
2002/0173390 A1 * 11/2002 Sommer et al. .............. 474/18
2007/0131883 A1 * 6/2007 Goodrich et al. ............. 251/12
2008/0164752 A1 * 7/2008 Wedekind .................. 303/22.1

FOREIGN PATENT DOCUMENTS

DE         27 45 276 A1     3/1978
DE         103 20 580 A1    11/2004
DE      10 2004 057 522 A1   4/2006
DE      10 2004 057 739 A1   4/2006

OTHER PUBLICATIONS

Windkraftanlagen, 3rd edition, Springer-Verlag Berlin, Chapter 8.7.

* cited by examiner

*Primary Examiner*—Christopher P Schwartz
(74) *Attorney, Agent, or Firm*—Vidas, Arrett & Steinkraus, P.A.

(57) ABSTRACT

A wind energy plant with a hydraulically actuated rotor brake for a drive train, which has at least one hydraulically actuated brake cylinder, the braking moment of which gets stronger when the hydraulic pressure increases, wherein a volume of hydraulic fluid is tensioned by a pressure reducing valve in the brake cylinder and in the pressure line thereof when the brake is actuated, wherein an accumulator with hydraulic fluid is provided, which is connected to the pressure line.

13 Claims, 1 Drawing Sheet

WIND ENERGY PLANT WITH A HYDRAULICALLY ACTUATED ROTOR BRAKE

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The present invention is related to a wind energy plant with a hydraulically actuated rotor brake.

Wind energy plants have generally a rotor brake in the drive train. The rotor brake is mostly arranged behind the gearbox, and in wind energy plants with an active pitch adjustment, it serves as an additional braking system, by which the rotor of the wind energy plant is maintained in its position when it stands still.

Erich Hau points out in Windkraftanlagen, $3^{th}$ edition, Springer-Verlag Berlin, Chapter 8.7, the entire contents of which is incorporated herein by reference, that braking the rotor to stand still is unavoidable for maintenance and repair works, and is in general also usual during the normal standstill periods. With respect to the function of the rotor brake in the operation, it is further pointed out that the same is limited to the pure holding function at rotor standstill in the simplest case. It is said that the brake must be dimensioned for the required holding moment of the rotor at standstill in this case. In addition to its function as a pure holding brake, the rotor brake might in principle also be dimensioned as a service brake, provided that the braking moment and the braking power (thermal load) are sufficient.

In wind energy plants in which the rotor brake is a part of the safety system, the braking system is realised as a passive brake or as a so-called FailSafe-brake. This means that the brake has to be pressurised in order to reduce the braking moment bearing on or in order to release the brake completely. The braking moment of the passive brake is achieved by a spring assembly, which pretensions the assigned brake shoes into the braking position. The braking moment applied in doing so is generated by the elastic force exerted by the spring elements. Due to this, it is necessary to provide correspondingly great spring assemblies in the brake for a wind energy plant, which necessitates a strong braking moment. The passive rotor brake described above is released by introducing a hydraulic fluid into the brake cylinder, for instance. The hydraulic fluid is introduced into the brake cylinder such that its pressure acts against the force of the spring assembly.

In contrast to the passive brakes described above, active brakes for wind energy plants are also known, in which the braking moment is not applied via a spring assembly, but instead at increasing hydraulic pressure the braking moment gets also stronger. The advantage of an active brake is that the same can be made smaller and that it is significantly more cost-saving. Also, a significantly greater braking moment is possible with an active brake.

When using an active brake as a service brake, thus for braking down the rotating drive train, high pressure variations may occur due to tolerances in the run-out and in the thickness of the brake disc. High pressure variations occur in particular in the case when hydraulic fluid is tensioned in the brake cylinder and its supply line with the aid of a pressure reducing valve. Using a pressure reducing valve in the hydraulics is necessary for active brakes in particular, inasmuch as the same are used as service- or holding brakes.

The present invention is based on the objective to provide a hydraulically actuated apparatus which compensates pressure variations with simple means, which take place in the braking with a tensioned volume of hydraulic fluid.

BRIEF SUMMARY OF THE INVENTION

The wind energy plant according to the present invention is equipped with a hydraulically actuated rotor brake for a drive train. The rotor brake has at least one hydraulically actuated brake cylinder, whose braking moment gets stronger when the hydraulic pressure increases. The rotor brake is an active rotor brake. According to the present invention, a hydraulic accumulator is provided with hydraulic fluid, which is connected to a pressure line, via which a brake pressure of the hydraulic fluid is applied to the brake cylinder when the drive train is braked down. The accumulator according to the present invention is provided in order to compensate pressure variations in the pressure line during a braking process in which the brake pressure is bearing on the brake cylinder.

In a hydraulically actuated rotor brake, it is commonly distinguished between brake pressure and holding pressure of the hydraulic fluid. In this, the brake pressure is smaller than the pressure bearing on the brake cylinder during the holding operation (holding pressure). The present invention provides to use the accumulator only during the braking process. This means that the accumulator is only provided with a significantly lower pre-fill pressure than an accumulator which is also dimensioned for tolerating the holding pressure. Thus, a smaller accumulator dimension can be used in the wind energy plant according to the present invention.

In a preferred extension of the wind energy plant according to the present invention, a first pressure reducing valve is provided, which reduces an applied system pressure to the brake pressure. Preferably, the accumulator according to the present invention is connected to a pressure line which connects the output of the first pressure reducing valve with the brake cylinder. The pressure provided in the accumulator of the hydraulic fluid is equivalent to the brake pressure of the hydraulic fluid, so that variations in the brake pressure can be compensated.

In addition, the hydraulics has a second pressure reducing valve which reduces the system pressure of the hydraulic fluid to the holding pressure of the hydraulic fluid. The holding pressure of the hydraulic fluid is equivalent to the pressure which is requited to generate at least the necessary holding moment at the brake cylinder. Due to the smaller friction coefficient of the combination of brake linings and brake disc in the cold state, the holding pressure at standstill of the drive train is higher than the brake pressure.

In a preferred embodiment, the pressure lines departing from the pressure reducing valves are optionally connectable to a pressure line to the brake cylinder via a switchover valve. A switchover unit is practically provided, which controls the switchover valve in order to connect the first or second pressure reducing valve with the brake cylinder. The switchover unit presets when the pressure of the first pressure reducing valve and when the pressure of the second pressure reducing valve is applied to the brake cylinder.

Preferably, the switchover unit controls the switchover valve hydraulically. However, it is also possible that the switchover unit controls the switchover valve electrically.

Practically, the pressure line to the brake cylinder is connected to the tank via a 2/2-port valve. By opening the 2/2-port valve, the pressure can be released from the brake cylinder and the brake cylinder opens. A pressure system is provided for the pressure lines of the rotor brake, which provides hydraulic fluid in a sufficient amount in a fail-safe manner.

BRIEF DESCRIPTION OF THE DRAWING

The present invention is explained in more detail by means of a drawing in the following.

DETAILED DESCRIPTION OF THE INVENTION

Figure 1:
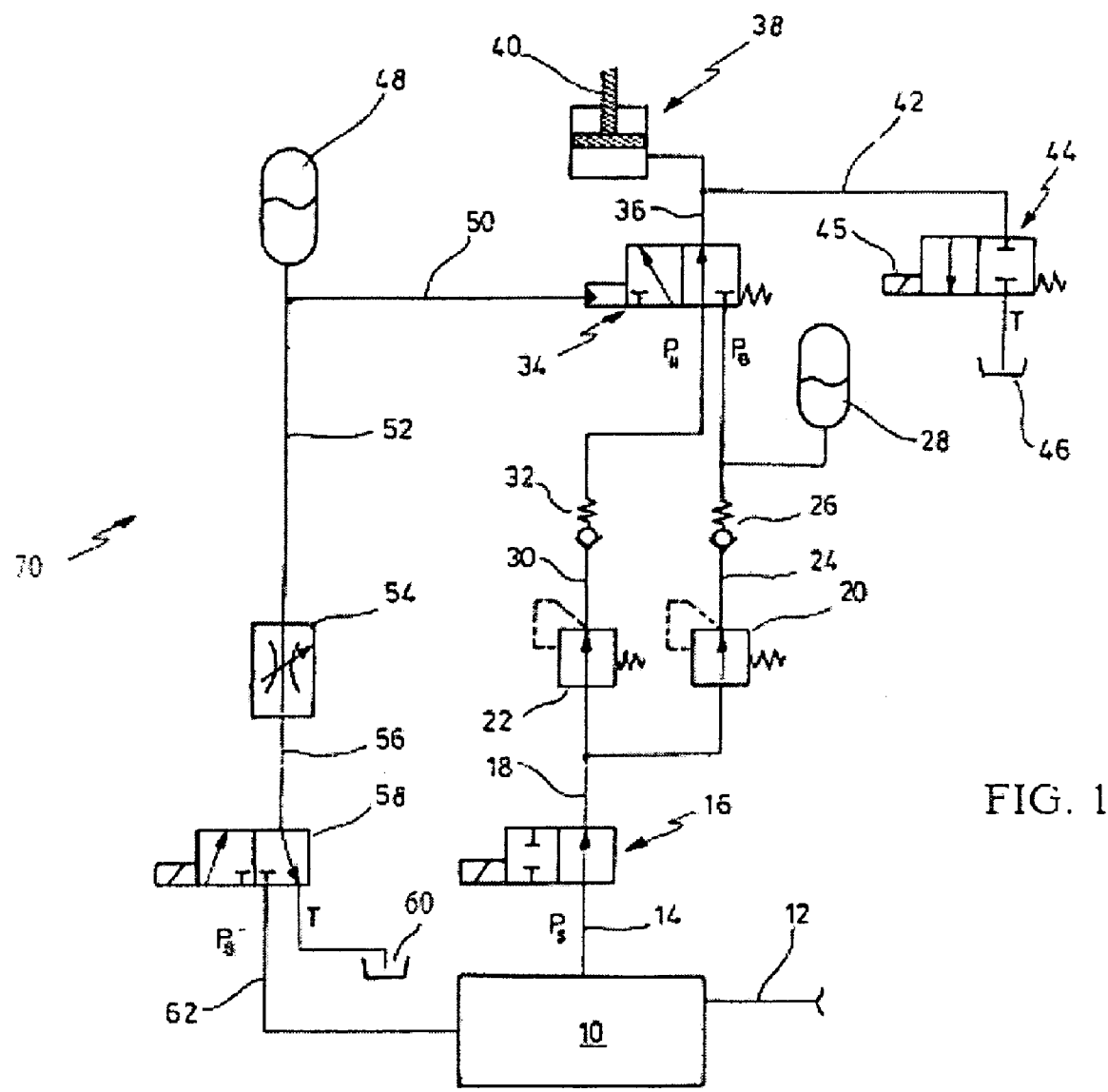
FIG. 1 shows a schematic view of a hydraulic system for controlling a rotor brake.

While this invention may be embodied in many different forms, there are described in detail herein a specific preferred embodiment of the invention. This description is an exemplification of the principles of the invention and is not intended to limit the invention to the particular embodiment illustrated A pressure system 10 provides a hydraulic fluid at a system pressure $p_S$. Via additional pressure lines 12, the pressure system 10 can also supply other hydraulic consumers of the wind energy plant.

The pressure system feeds a first pressure line 14, in which a 2/2-port valve is disposed. The 2/2-port valve 16 is mechanically pretensioned into its open position.

The 2/2-port valve can be set electrically into a locked position, in which a pressure in the pressure line 18 remains conserved.

The pressure line 18 bifurcates and runs out into a first pressure reducing valve 20 and connected parallel thereto into a second pressure reducing valve 22. The first pressure reducing valve 20 reduces the applied system pressure $p_S$ to the brake pressure $p_B$. A pressure line 24 is provided with a check valve 26, which prevents the hydraulic fluid from flowing back into the pressure system 10. The pressure line 24 is connected with an accumulator 28, which contains hydraulic fluid. In this, the hydraulic fluid in the accumulator 28 has the brake pressure $p_B$.

A second branch with the second pressure reducing valve 22 is connected parallel to the branch described above with the first pressure reducing valve 20. On the second pressure reducing valve 22, the system pressure $p_S$ is also applied via the pressure line 18. The pressure reducing valve 22 reduces the pressure of the hydraulic fluid to the holding pressure $p_H$, which is needed to bring up the necessary holding moment when the drive train stands still. Normally, holding pressure and holding moment are greater than brake pressure and braking moment of the rotor brake.

The output line 30 of the second pressure reducing valve 22 is also provided with a spring-pretensioned check valve 32.

Pressure lines 24 and 30 run out into a first hydraulically pre-controlled 3/2-port valve 34. In its spring-pretensioned position, which is designated with b, the first 3/2-port valve switches the holding pressure $P_H$ of the pressure line 30 to a pressure line 36, which leads to the brake cylinder 38. In its position designated with a, the first 3/2-port valve switches the brake pressure $p_B$ from the pressure line 24 to the pressure line 36. The pressure line 36 leads to a schematically depicted brake cylinder with a brake piston 40. The brake cylinder 40 is actuated via the introduced hydraulic fluid and it exerts a corresponding force on the brake lining of the brake. The pressure line 36 is connected to a 2/2-port valve 44 via an additional pressure line 42. In its spring-pretensioned position, the 2/2-port valve locks the pressure line 42. By an electric actuation member 45, the 2/2-port valve 44 can be switched over into its open position and it leads the hydraulic fluid into a tank 46. Thus, the brake cylinder 38 is discharged and the brake is disengaged.

The actuation of the switchover valve 34 takes place hydraulically in the depicted example of realisation. For this purpose, a hydraulic switchover unit 70 is provided, which has an accumulator 48 for hydraulic fluid. The accumulator 48 is connected to the first 3/2-port valve 34 via a control line 50. The pressure line 52 has flow control valve 54, which is connected to a second 3/2-port seat valve 58 via the pressure line 56. In its nonflow position, the second 3/2-port seat valve 58 is connected to a tank 60, into which the hydraulic fluid from the accumulator 48 can flow off. In its second position, the 3/2-port seat valve connects the pressure line 62 of the pressure system 10 with the accumulator 48, in order to re-establish the desired pressure in the accumulator. In the operation of the depicted switchover unit 70, the pressure in the accumulator 48 is reduced when the hydraulic fluid flows out of the tank 60. As soon as it has fallen below a predetermined pressure value, the switchover valve 34 switches over between holding pressure and brake pressure.

In the operation, the first 3/2-port valve 34 serving as a switchover valve is in the position a when the braking begins. The system pressure is lowered to the desired brake pressure via the pressure reducing valve 20 and the brake cylinder is closed. With the aid of the damping accumulator 28, the volume existing in the rotor brake, caused by dimensional tolerances of the brake disc, is buffered, the brake pressure remaining constant in this. The damping accumulator is realised as a per se known hydraulic accumulator, in which a compressible medium is provided for the generation of the pressure. After the drive train has reached standstill, the first 3/2-port valve 34 is switched and the high holding pressure is bearing on. Through this, the damping accumulator 24 is taken out of the pressure system, so that the same is not pressurised with the holding pressure. The switchover between brake pressure and holding pressure takes place in a time-dependent manner. In the depicted example of realisation, the time period up to the switchover depends from how long it lasts until the hydraulic fluid from the accumulator 48 has fallen below a predetermined pressure value. Alternatively, it is also possible to provide an electric timing member for the switchover.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A wind energy plant with a hydraulically actuated rotor brake for a drive train, which has at least one hydraulically actuated brake cylinder (38), a braking moment of which gets stronger when hydraulic pressure increases, comprising:
   a first pressure reducing valve (20) which reduces an applied system pressure ($p_S$) to a brake pressure ($p_B$);
   a second pressure reducing valve (22) which reduces the system pressure ($p_S$) to a holding pressure ($p_H$);
   an accumulator (28) with hydraulic fluid which is connected to a first pressure line (24), the first pressure line (24) connecting the first pressure reducing valve (20) with the brake cylinder (38);
   a second pressure line (30);
   the first and second pressure lines (24, 30) departing from the first and second pressure reducing valves (20, 22) being alternatively connectable to a pressure line (36) to the brake cylinder (38) via a switchover valve (34).

2. A wind energy plant according to claim 1, further comprising a switchover unit (70), the switchover unit (70) controlling the switchover valve (34) in order to connect the first or second pressure reducing valve with the brake cylinder.

3. A wind energy plant according to claim 2, the switchover unit (70) comprising an accumulator (48).

4. A wind energy plant according to claim 3, the accumulator (48) being connected to the switchover valve (34) by a control line (50).

5. A wind energy plant according to claim 3 the switchover unit (70) further comprising a tank (60), the accumulator (48) in fluid communication with the tank (60).

6. A wind energy plant according to claim 2, characterised in that the switchover unit controls the switchover valve (34) hydraulically.

7. A wind energy plant according to claim 2, characterised in that the switchover unit controls the switchover valve (34) electrically.

8. A wind energy plant according to claim 1, characterised in that the switchover valve (34) has a first position that separates the accumulator (28) from the brake cylinder.

9. A wind energy plant according to claim 1, characterised in that a hydraulic pressure in the accumulator (28) is equivalent to the brake pressure ($p_B$).

10. A wind energy plant according to claim 1, characterised in that the holding pressure ($p_H$) is greater than the brake pressure ($p_B$).

11. A wind energy plant according to claim 1, characterised in that the pressure line (36) to the brake cylinder (38) is connected to a tank (46) via a 2/2-port valve (44).

12. A wind energy plant according to claim 1, characterised in that a pressure system (10) is provided for the pressure lines, which provides hydraulic fluid in a fail-safe manner.

13. A hydraulic system for controlling a rotor brake, the hydraulic system comprising:
   a first pressure reducing valve, the first pressure reducing valve reducing an applied system pressure (pS) to a brake pressure (pB);
   a second pressure reducing valve, the second pressure reducing valve reducing the applied system pressure (pS) to a holding pressure (pH);
   a switchover valve;
   a first pressure line, the first pressure line having a first end and a second end, the first end being engaged to the first pressure reducing valve and the second end being engaged to the switchover valve;
   a second pressure line, the second pressure line having a first end and a second end, the first end being engaged to the second pressure reducing valve and the second end being engaged to the switchover valve;
   a third pressure line, the third pressure line engaging the switchover valve and a brake cylinder;
   the first and second pressure lines being alternatively connectable to the third pressure line by the switchover valve.

* * * * *